(12) United States Patent  
Mefford et al.

(10) Patent No.: US 6,554,024 B2
(45) Date of Patent: Apr. 29, 2003

(54) STEM SEAL PRESSURE TELLTALE

(75) Inventors: David R. Mefford, The Woodlands, TX (US); Paul M. Gutmann, Clute, TX (US); Daryl L. Ard, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 104 days.

(21) Appl. No.: 09/767,789

(22) Filed: Jan. 23, 2001

(65) Prior Publication Data

US 2002/0096218 A1 Jul. 25, 2002

(51) Int. Cl.$^7$ ............................................. F16K 37/00
(52) U.S. Cl. ...................... 137/557; 137/312; 277/320
(58) Field of Search .................. 137/312, 557; 277/320

(56) References Cited

U.S. PATENT DOCUMENTS

| | | | |
|---|---|---|---|
| 3,544,064 A | 12/1970 | Carlin | 251/214 |
| 3,912,221 A | 10/1975 | Fenster et al. | 251/214 |
| 4,230,299 A | 10/1980 | Pierce, Jr. | 251/14 |
| 4,272,055 A | 6/1981 | Herd | 251/214 |
| 4,364,542 A | 12/1982 | Meyer | 251/214 |
| 4,379,557 A | 4/1983 | Saka | 277/59 |
| 4,497,340 A | 2/1985 | Gain, Jr. | 137/556 |
| 4,510,966 A | 4/1985 | Parsons, Jr. | 137/375 |
| 4,575,101 A | 3/1986 | Hopkins | 277/72 |
| 4,813,648 A | 3/1989 | Walton et al. | 251/304 |
| 4,940,208 A | 7/1990 | Kemp | 251/315 |
| 4,972,867 A | 11/1990 | Ruesch | 137/15 |
| 5,129,624 A | 7/1992 | Icenhower et al. | 251/214 |
| 5,211,532 A | 5/1993 | Thompson | 415/113 |
| 5,244,183 A | 9/1993 | Calvin et al. | 251/214 |
| 5,607,165 A | 3/1997 | Bredemeyer | 277/2 |
| 5,669,414 A | * 9/1997 | Miller | 137/557 |

* cited by examiner

Primary Examiner—Gerald A. Michalsky
(74) Attorney, Agent, or Firm—Michael P. Hartmann; Peter A. Bielinski

(57) ABSTRACT

A visual signal of pressure between valve stem seals is given by a rising ring, which moves upwardly with the upper stem seal when there is pressure between the stem seals. The rising ring is held to the stem or valve body around the stem by a retaining ring. The rising ring, in its up position, precludes removal of the retaining ring.

17 Claims, 4 Drawing Sheets

STEM SEAL PRESSURE TELLTALE

FIELD OF THE INVENTION

The field of this invention relates to visual indicators of pressure, particularly on valve stem seals, which act as a warning to personnel to relieve such pressure prior to attempting any disassembly.

BACKGROUND OF THE INVENTION

Valves of all types have been in use in the oil and gas industry for a variety of purposes. Valves have typically had stems that extend through their bodies with a manual or powered operator attached to the stem. Depending on the valve design these stems could be of the rising or non-rising type. The stem would feature a sealing system to prevent pressure inside the valve body from escaping. Stem seals could involve packing or seal rings or combinations of such devices. In some valves, there were two stem seals with access to an annular space between them through an opening, which was plugged or had a grease fitting. Some illustrative examples are U.S. Pat. Nos. 5,129,624: 3,544,064(illustrating the use of a grease fitting): and 4,575,101. In some applications, the access to the annular space between an upper and lower stem seal featured the ability to add a sealing material under pressure or to mount a detector to sense leakage into the annular space between the stem seals. Some illustrative examples are U.S. Pat. Nos. 4,972,867; and 4,364,542. In yet another example, in U.S. Pat. No. 4,230,299 the annular space between the two stem seals is in communication with a plug, which blows out upon leakage of a stem seal. This design is clearly inapplicable to toxic service because it may be fatal to personnel if the plug 144 blows at an inopportune time. Additionally, the fact that the plug 144 is not in place may be indicative of the fact that the plug was never installed or that, in the past, there was a leak past a stem seal but there may be no leakage problem at the present time.

In other designs, the annular area between the stem seals would be pressurized to a higher pressure level than seen in the valve body. This auxiliary pressure system would have a pressure source and a pressure accumulator chamber as well as some indication of the pressure in the auxiliary system being applied to the annular space. Pressure and fluid detectors were sometimes combined with such systems. Some examples are U.S. Pat. Nos. 5,244,183(note the pressure indicating rod 81 on the accumulator 34); and 5,211,532(note hinged flaps 73 which turn responsively to piston movement signaling fluid addition to the annular space).

The auxiliary systems just described had several negative attributes, which limited their application. These systems were expensive, took up space unavailable in some applications, added weight, increased fit-up time, and required additional maintenance above and beyond routine valve maintenance. The issue of routine valve maintenance raises important personnel safety questions. It is very unsafe for personnel to disassemble valve bonnets for the purpose of stem seal inspection or replacement when there is trapped pressure between the stem seals. Undeniably, some personnel are better trained in safety procedures. To these people it is a matter of routine to always vent the annular space between the stem seals before loosening the top bonnet. This can be simply accomplished by removing a plug in an opening in fluid communication with the annulus between the stem seals or, if there is one, by opening a valve in communication with the annulus. The problem is that some personnel are not as diligent and could release the bonnet with pressure on the upper stem seal. The released fluid or the bonnet being propelled by fluid pressure could cause a severe injury. One other attempt to deal with this problem in the past has been to put enough thread on the bonnet or its fasteners to allow pressurized fluid venting while the bonnet is still engaged to the valve body by a few threads. This procedure also raised several safety issues. If the fasteners or the bonnet were turned too quickly or if the threads failed to hold a severe accident could occur. Other valve designs of general interest are U.S. Pat. Nos. 4,940,208; 4,497,340; 4,510,966; and 4,813,648.

What is needed is a new paradigm in signaling operations and maintenance workers of the potential dangers of trapped fluid under a stem seal. The object of this invention is to provide just such a solution, which, upon more universal use in the industry, will reduce personal injuries when valves are inspected and maintained. In order to accomplish this ambitious goal, the proposed solution must be so simple in operation and readily integrated into existing valve body molds that it will gain universal acceptance. The objective of the present invention is to fulfill this need in the industry with a simple, economical design that, at a glance, provides the needed warning that pressure exists in the annular space between the stem seals. Those skilled in the art will appreciate how the objective of the invention is met by a review of the description of the preferred embodiment, which appears below.

SUMMARY OF THE INVENTION

A visual signal of pressure between valve stem seals is given by a rising ring, which moves upwardly with the upper stem seal when there is pressure between the stem seals. The rising ring is held to the stem or valve body around the stem by a retaining ring. The rising ring, in its up position, precludes removal of the retaining ring.

BRIEF DESCRIPTION OF THE DRAWINGS

FIG. 3 is the view of FIG. 1 with the rising ring in the up position due to pressure between the stem seals, while

DETAILED DESCRIPTION OF THE PREFERRED EMBODIMENT

Figure 1:
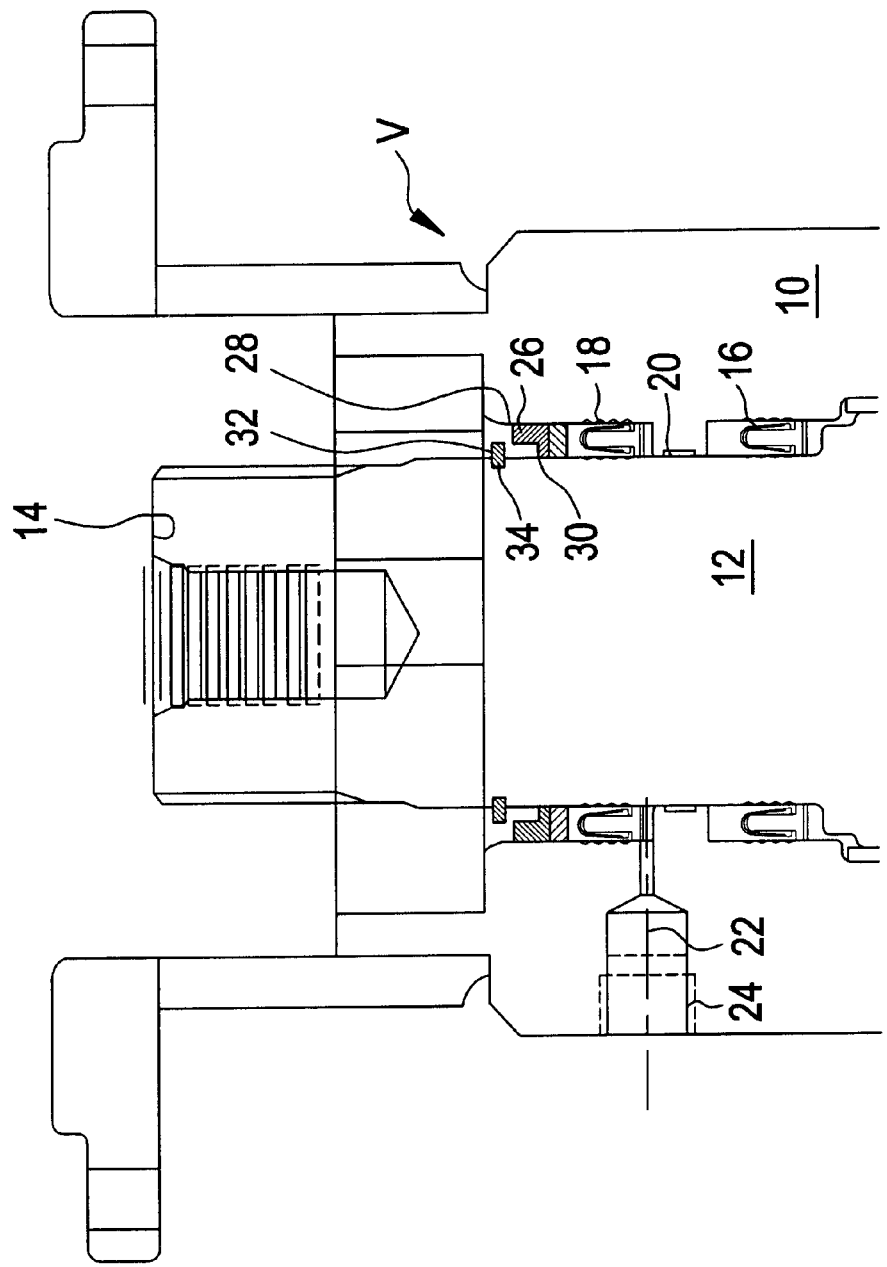
FIG. 1 is a half section elevation view illustrating the installation of the locking ring.
Figure 2:
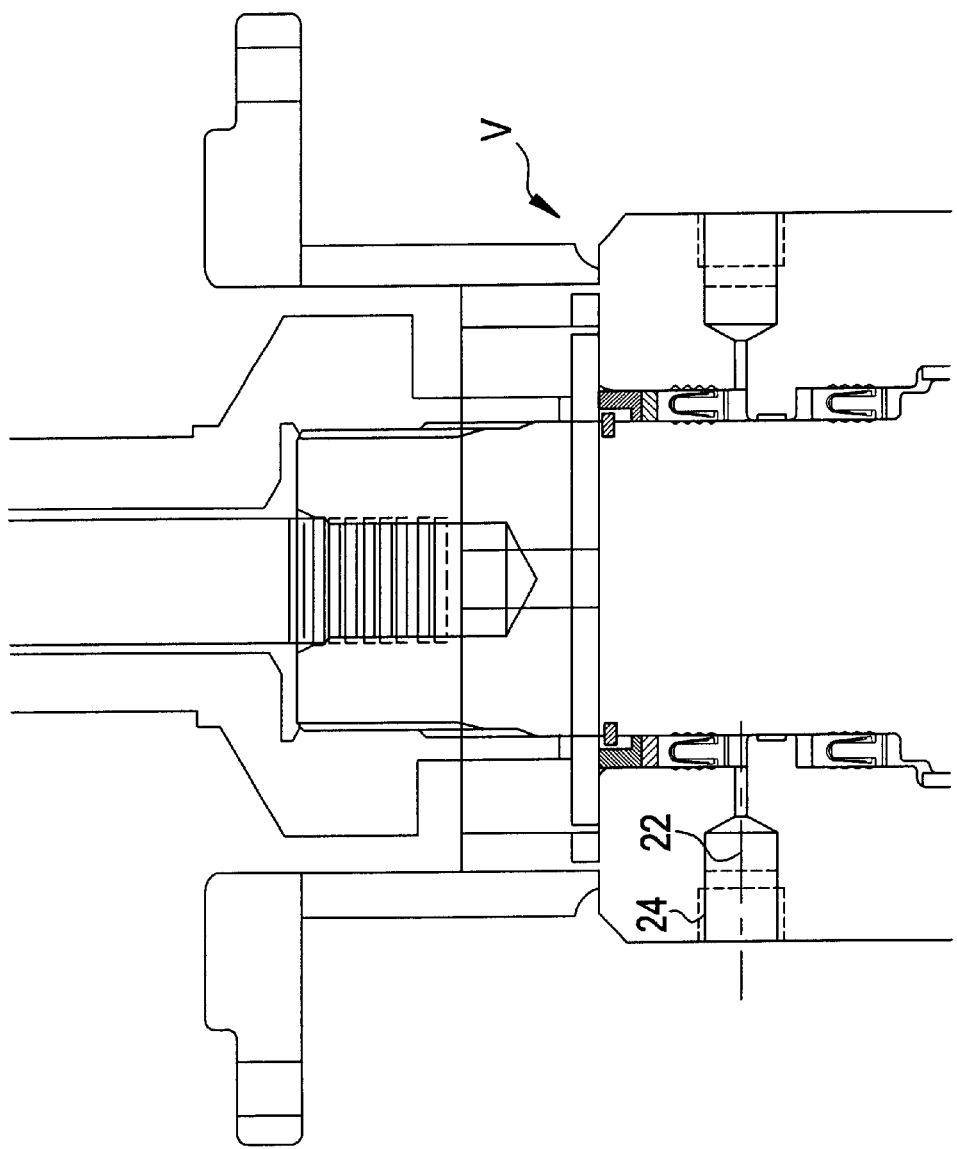
FIG. 2 is a half section of FIG. 1, showing the rising ring in the normal position, with no pressure between the stem seals.

Referring to FIG. 1, the valve V has a body 10 and a non-rising stem 12, which has an upper end 14 extending out of body 10. A lower stem seal 16 and an upper stem seal 18 which are spaced apart to define an annular space 20 in between surround stem 12. A passage 22 communicates with annular space 20 (as shown in FIG. 2). A valve (not shown) can be mounted at thread 24. A rising ring 26 has a preferably L-shaped cross-section evidenced by a vertical segment 28 attached to a horizontal segment 30. The rising ring 26 acts as an indicator of pressure in annular space or cavity 20. A retaining ring 32 can be snapped into a groove 34 on the stem 12, where it acts as a travel stop for the horizontal segment 30.

Figure 3:
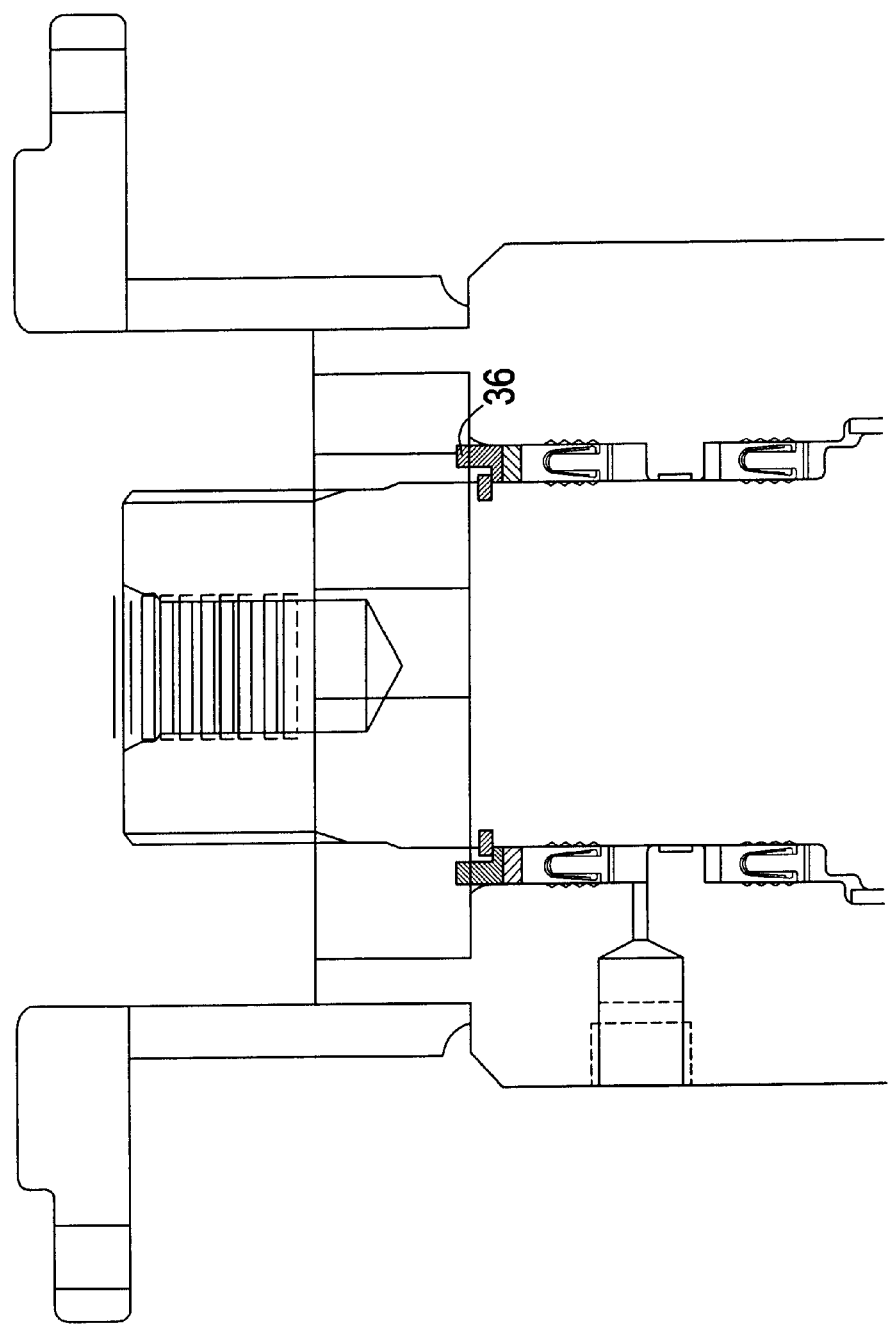
Figure 4:
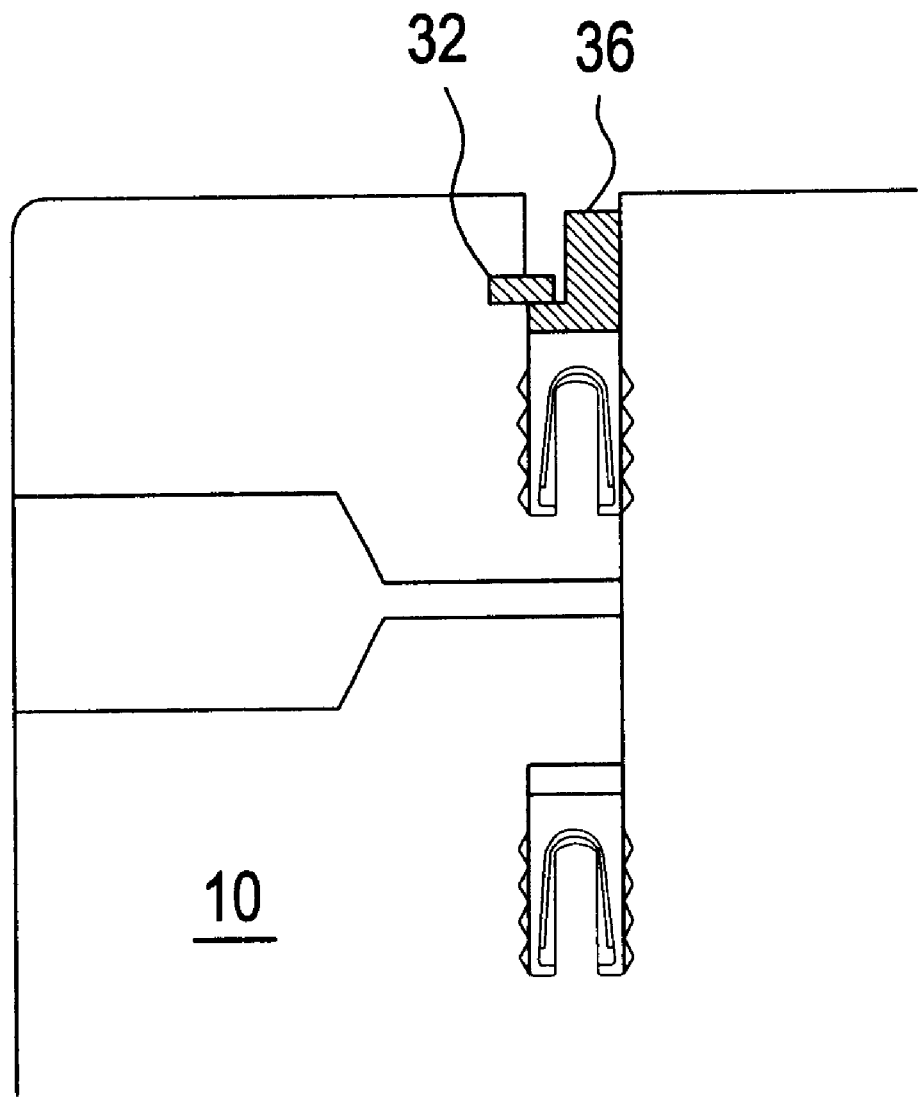
FIG. 4 shows an alternative embodiment with the rising ring retained on the body rather than the stem.

FIG. 1 illustrates that the rising ring 26 must be displaced downwardly to insert the retaining ring 32. This is because the retaining ring 32 can be in the nature of a snap ring with end loops so that a pair of snap ring pliers into its loops can expand it into groove 34. Alternatively, ring 32 can be a spiral retaining ring, which is expanded over the stem 12 and snapped into groove 34 or any other suitable fastener to retain rising ring 26. Accordingly, unless the rising ring 26 is downwardly displaced, as shown in FIG. 1, the retaining ring 32 cannot be advanced into groove 34. By the same token, as shown in FIG. 3, when there is pressure between the seals 16 and 18 causing seal 18 and rising ring 26 to rise in tandem, there is also no way to get the retaining ring 32 out. This is because the presence of the vertical segment 28 immediately surrounding retaining ring 32 traps it into groove 34, precluding its removal. FIG. 3 also illustrates how the horizontal segment 30 acts as a travel stop, for rising ring 26, when it engages the retaining ring 32. When this happens, the upper end 36 of the vertical segment 28 clearly extends beyond body 10 where it can serve as a signal that there is pressure under seal 18. To aid in this signaling feature, the upper end 36 can be made a material having a high visibility color or it can be painted such a color. The length of the vertical segment 28 or the amount of vertical travel it has can be varied so as to make it even more apparent that a situation of pressure in annular space 20 exists.

The beauty of this system is that even if the operations or maintenance person fails to notice the visual signal presented by an extending end 36 of vertical segment 28 and an attempt is made to remove the retaining ring 32, it will not come out. The pressure acting on seal 18 and pushing it up with rising ring 26 against retaining ring 32 will trap the retaining ring 32 to the stem 12 by virtue of peripheral contact from vertical segment 28(see FIG. 3).

FIG. 2 illustrates that during normal operations, vertical segment 28 does not extend from body 12 and that there is a gap between the retaining ring 32 and horizontal segment 30 of rising ring 26. This gap is at its largest during assembly, as reflected in FIG. 1.

Those skilled in the art will appreciate that the preferred embodiment described above was for an installation with a non-rising stem. A simple adaptation can make this design workable for a rising stem valve. The L-shaped cross-section of the rising ring 26 can simply be inverted and the retaining ring can be attached to the valve body 10 instead of the stem 12. Thread 24 can also accept a detector for local or remote signaling that a leak at seal 16 has occurred. Additionally, if remote indication of pressure in annular cavity 20 is desired a sensor can detect upward movement of rising ring 26 and an audible or visual alarm can be displayed remotely. The present invention can, due to its simplicity, be retrofitted into existing valve designs with no or minimal mold changes to the particular valve body. The present invention is particularly desirable because of its simplicity, ease of retrofit, and the interlock feature, which prevents removal of the retaining ring 32 even if operations or maintenance personnel ignore the signal from the extending upper end 36 of vertical segment 28 of rising ring 26. While the invention has been described as useful for valve stem seals, it has many applications in signaling leakage past other types of seals such as rotating or reciprocating shafts or as a telltale for zones where pressure is not anticipated but for some equipment malfunction in a variety of applications, not limited to valves.

The description of the invention above is illustrative of the preferred embodiment and the full scope of the invention can be determined from the claims, which appear below.

We claim:

1. A telltale system to provide a visual signal of pressure in a valve body having a valve stem, comprising:
    at least one seal movably mounted on said valve stem and movable in response to pressure reaching it from the body;
    an indicating member movably mounted in the body and displaceable by said seal so that at least a portion of said indicating member extends from the body;
    a travel stop to limit the movement of said indicating member outwardly from the body;
    means for allowing insertion and removal of said travel stop only when said indicating member does not extend from the body.

2. The system of claim 1, wherein:
    said indicating member comprises an end having a bright color to facilitate observation that said end extends from the body.

3. A telltale system to provide a visual signal of pressure in a body, comprising:
    at least one seal movably mounted to said body and movable in response to pressure reaching it from the body;
    an indicating member movably mounted in the body and displaceable by said seal so that at least a portion of said indicating member extends from the body;
    a travel stop to limit the movement of said indicating member outwardly from the body;
    said travel stop is insertable and removable only when said indicating member does not extend from the body;
    said travel stop further comprises a ring, which is disposed in a groove;
    said indicating member when displaced by said seal in a direction out of the body, encircles said ring, precluding its removal from said groove.

4. The system of claim 3, wherein:
    said indicating member has an L-shaped cross-section comprising a vertical component, which selectively extends from the body and a horizontal component, which selectively engages said travel stop.

5. The system of claim 3, wherein:
    said groove is disposed on the body.

6. A telltale system to provide a visual signal of pressure in a body, comprising:
    at least one seal movably mounted to said body and movable in response to pressure reaching it from the body;
    an indicating member movably mounted in the body and displaceable by said seal so that at least a portion of said indicating member extends from the body;
    a travel stop to limit the movement of said indicating member outwardly from the body;
    said seal and said indicating member are movably mounted around a valve stem in the body;
    said travel stop is secured to a groove located on the stem.

7. The system of claim 6, wherein:
    said at least one seal comprises a stationary lower seal and a movable upper seal both disposed around the valve stem to seal off an annular space in the body around the stem, whereupon leakage of fluid from the body past said lower seal, said annular cavity is pressurized and said upper seal and said indicating member move in tandem with respect to the valve stem until said travel stop is engaged and a portion of said indicating member extends out of the body.

8. A telltale system to provide a visual signal of pressure in a body, comprising:
- at least one seal movably mounted to said body and movable in response to pressure reaching it from the body;
- an indicating member movably mounted in the body and displaceable by said seal so that at least a portion of said indicating member extends from the body;
- a travel stop to limit the movement of said indicating member outwardly from the body;
- said seal and said indicating member are movably mounted around a valve stem in the body;
- said travel stop is secured to a groove located on the body.

9. A leakage indicating system for a valve stem, comprising:
- a valve body having a valve stem extending out of an opening thereof;
- at least one seal movably mounted around said stem;
- a pressure indicator movably mounted for tandem movement with said seal, whereupon pressure acting on said seal, at least a portion of said pressure indicator extends from said body.

10. The system of claim 9, further comprising:
- a travel stop to limit movement of said pressure indicator out of said body.

11. The system of claim 10, wherein:
- said travel stop and said pressure indicator cannot be removed when they are in contact with each other.

12. The system of claim 11, wherein:
- said travel stop comprises a ring, which snaps into a groove:
- said pressure indicator comprises an L-shaped ring having a vertical component, which selectively encircles said ring to keep it from being removed from said groove.

13. The system of claim 12, wherein:
- said pressure indicator further comprises a horizontal component for selective contact with said travel stop.

14. The system of claim 13, wherein:
- said groove is disposed on said valve stem.

15. The system of claim 14, wherein:
- said at least one seal comprises a stationary lower seal and a moveable upper seal defining an annular cavity between them which is not normally pressurized if said lower seal is functional, whereupon failure of said lower seal said cavity is pressurized driving said upper seal in tandem with said pressure indicator into said travel stop.

16. The system of claim 15, wherein:
- said pressure indicator comprises a bright color adjacent an end of said vertical component to facilitate it being observed when it extends from the body.

17. The system of claim 13, wherein:
- said groove in disposed on said body.

* * * * *